US012288158B2

(12) United States Patent
Bokadia et al.

(10) Patent No.: US 12,288,158 B2
(45) Date of Patent: Apr. 29, 2025

(54) INTELLIGENT AUTOMATED IMAGING SYSTEM

(71) Applicant: Duke University, Durham, NC (US)

(72) Inventors: Pratik Bokadia, Durham, NC (US); Amey Chaware, Durham, NC (US); Roarke Horstmeyer, Durham, NC (US); Kanghyun Kim, Durham, NC (US); Pavan Konda, Durham, NC (US)

(73) Assignee: Duke University, Durham, NC (US)

( * ) Notice: Subject to any disclaimer, the term of this patent is extended or adjusted under 35 U.S.C. 154(b) by 174 days.

(21) Appl. No.: 17/830,058

(22) Filed: Jun. 1, 2022

(65) Prior Publication Data

US 2022/0334371 A1  Oct. 20, 2022

Related U.S. Application Data

(63) Continuation of application No. PCT/US2021/014734, filed on Jan. 22, 2021.

(60) Provisional application No. 62/965,483, filed on Jan. 24, 2020.

(51) Int. Cl.
| | |
|---|---|
| *G06N 3/08* | (2023.01) |
| *G02B 21/06* | (2006.01) |
| *G02B 21/36* | (2006.01) |
| *G06V 10/143* | (2022.01) |
| *G06V 10/145* | (2022.01) |
| *G06V 10/82* | (2022.01) |
| *G06V 20/69* | (2022.01) |

(52) U.S. Cl.
CPC ............... *G06N 3/08* (2013.01); *G02B 21/06* (2013.01); *G02B 21/365* (2013.01); *G06V 10/143* (2022.01); *G06V 10/145* (2022.01); *G06V 10/82* (2022.01); *G06V 20/698* (2022.01)

(58) Field of Classification Search
CPC .......... G06N 3/08; G06N 3/045; G02B 21/06; G02B 21/365; G06V 10/143; G06V 10/145; G06V 10/82; G06V 20/698; G06F 18/24133
See application file for complete search history.

(56) References Cited

U.S. PATENT DOCUMENTS

| | | | |
|---|---|---|---|
| 2010/0177187 A1* | 7/2010 | Hedlund | G06T 7/90 382/134 |
| 2017/0285320 A1* | 10/2017 | Fletcher | G02B 21/0008 |
| 2019/0147588 A1* | 5/2019 | Rowley Grant | G16H 30/40 382/131 |
| 2020/0409128 A1* | 12/2020 | Fahrbach | G02B 21/365 |
| 2021/0192295 A1* | 6/2021 | Stewart | G06V 10/141 |
| 2021/0219847 A1* | 7/2021 | Bernat | A61B 5/0205 |
| 2021/0289604 A1* | 9/2021 | Ando | B60Q 1/085 |

* cited by examiner

*Primary Examiner* — Michael E Teitelbaum
(74) *Attorney, Agent, or Firm* — Kory D. Christensen

(57) ABSTRACT

The present disclosure describes a computational imaging system that uses a supervised learning algorithm to jointly process the captured image data to identify task-optimal hardware settings and then uses the task-optimal hardware settings to dynamically adjust its hardware to improve specific performance. The primary application of this device is for rapid and accurate automatic analysis of images of biological specimens.

15 Claims, 8 Drawing Sheets

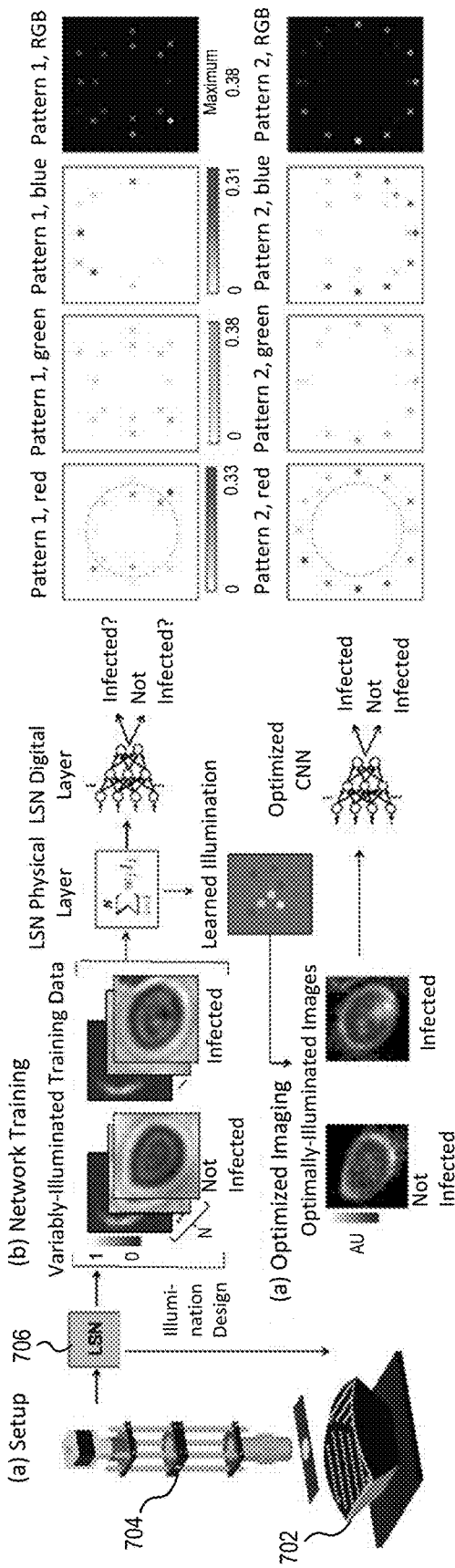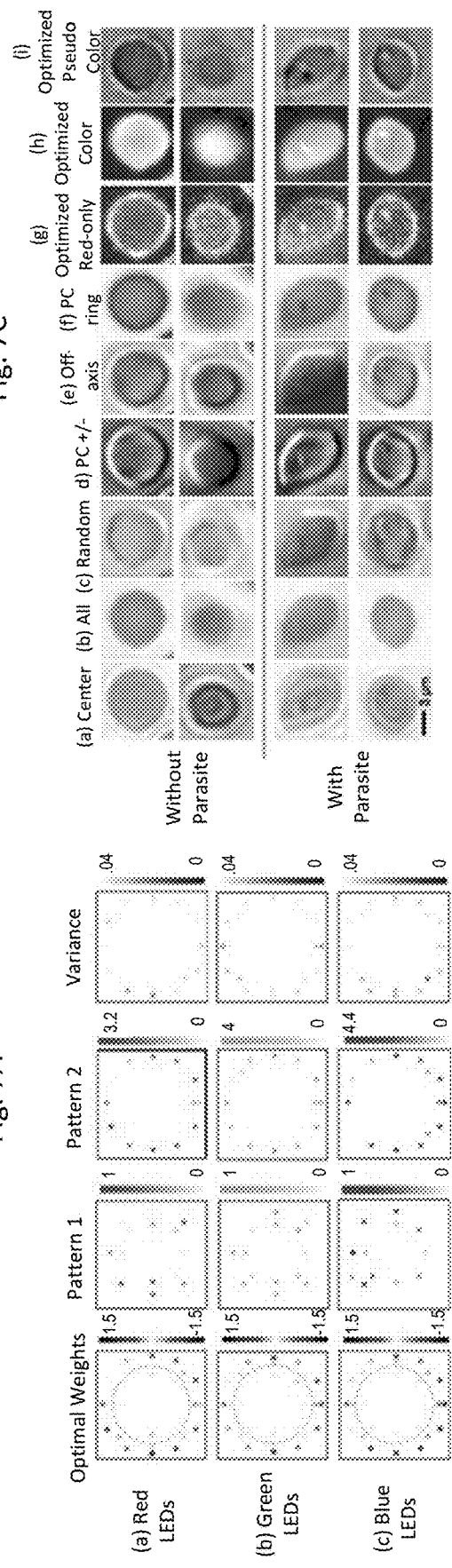

INTELLIGENT AUTOMATED IMAGING SYSTEM

CROSS-REFERENCE TO RELATED APPLICATIONS

This application is a continuation of International Application No. PCT/US21/14734, filed Jan. 22, 2021, for "Intelligent Automated Imaging System," which claims the benefit of U.S. Provisional Application No. 62/965,483, filed Jan. 24, 2020, each of which is incorporated herein by reference.

BACKGROUND

Optical microscopes have been an important scientific instrument for well over a century, and recent innovations such as digital imaging and artificial intelligence continue to advance their usefulness. Many standard tasks can now be automatically performed. However, the physical layout of the standard microscope has still changed relatively little. It is, for the most part, still optimized for a human viewer to peer through and inspect what is placed beneath. This presents a limitation in that human-centered microscopes cannot simultaneously image over a large area at high resolution. To see a large area, the sample must typically be physically scanned beneath the microscope, which can be time-consuming and subject to error, even when scanning is automated with a mechanical device. Additionally, it can be challenging to resolve many important phenomena using the traditional transmission optical microscope. For example, biological samples are often transparent, can contain subcellular features, and can cause light to scatter, all of which limit what can be deduced from visible observations. Further, the cost and/or size of the device also typically increases in relation to the imaging capabilities. Thus, there is an ongoing need for lower cost, portable, high-quality imaging of biological samples.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure provides an automated imaging system, comprising, consisting of, or consisting essentially of an optical hardware system having one or more tunable elements; a visual detector system; and a computing system. The computing system is configured to change a parameter of the one or more tunable elements in response to an automated decision by an artificial intelligence algorithm, and the automated decision is determined by analyzing images of a sample created by the visual detector system.

In some embodiments, the one or more tunable elements are dynamically addressable and comprise at least one of a patterned illumination unit, a lens system, and a sample positioning stage. In various configurations, the patterned illumination unit includes a programmable Light Emitting Diode (LED) array, the dynamically addressable includes an electro-tunable lens, and the movable sample positioning stage includes one or more of an x-y translation stage and a z-stage for focusing.

The artificial intelligence algorithm may include a neural network, such as a Deep Neural Network (DNN) or Convolutional Neural Network (CNN), and the automated decision is to detect objects of interest within a microscope slide, optionally within a blood smear.

The artificial intelligence algorithm is configured both to process digital images and to optimize task-specific settings for the one or more tunable elements. In one embodiment, the artificial intelligence algorithm optimizes the task-specific settings to reduce a task-specific loss function, which may be configured to evaluate error in classification by the automated imaging system.

The optical hardware system and visual detection system may be configured to perform automated scanning, and the results of the automated scanning may be fed into the artificial intelligence algorithm to improve the accuracy of the automated decision in subsequent scans.

Another aspect of the present disclosure provides a method of detecting an object or feature of interest in a biological sample, comprising, consisting of, or consisting essentially of using an optical hardware system and a visual detector system to create an image of a sample, wherein the optical hardware system includes one or more tunable elements; analyzing the image using an artificial intelligence algorithm to generate an automated decision; and adjusting at least one parameter of the one or more tunable elements based on the automated decision to maximize detection of the feature of interest. The method may further include iteratively feeding the at least one adjusted parameter into the artificial intelligence algorithm.

In some embodiments, the method includes initially imaging the sample at a low resolution and subsequently imaging the same sample at a higher resolution using the at least one adjusted parameter and affected by the one or more tunable elements.

Another aspect of the present disclosure provides a non-transitory computer readable medium storing program code that, when executed by a processor, perform a method of detecting an object or feature of interest in a biological sample, comprising, consisting of, or consisting essentially of using an optical hardware system and a visual detector system to create an image of a sample, wherein the optical hardware system includes one or more tunable elements; and analyzing the image using an artificial intelligence algorithm to generate an automated decision; and adjusting at least one parameter of the one or more tunable elements based on the automated decision to maximize detection of the feature of interest.

BRIEF DESCRIPTION OF THE DRAWINGS

The accompanying Figures are provided by way of illustration and not by way of limitation. The foregoing aspects and other features of the disclosure are explained in the following description, taken in connection with the accompanying example figures (also "FIG.") relating to one or more embodiments, wherein:

FIGS. 7A-7D illustrate an exemplary embodiment according to the present disclosure for detecting the malaria parasite.

DETAILED DESCRIPTION

Figure 1:
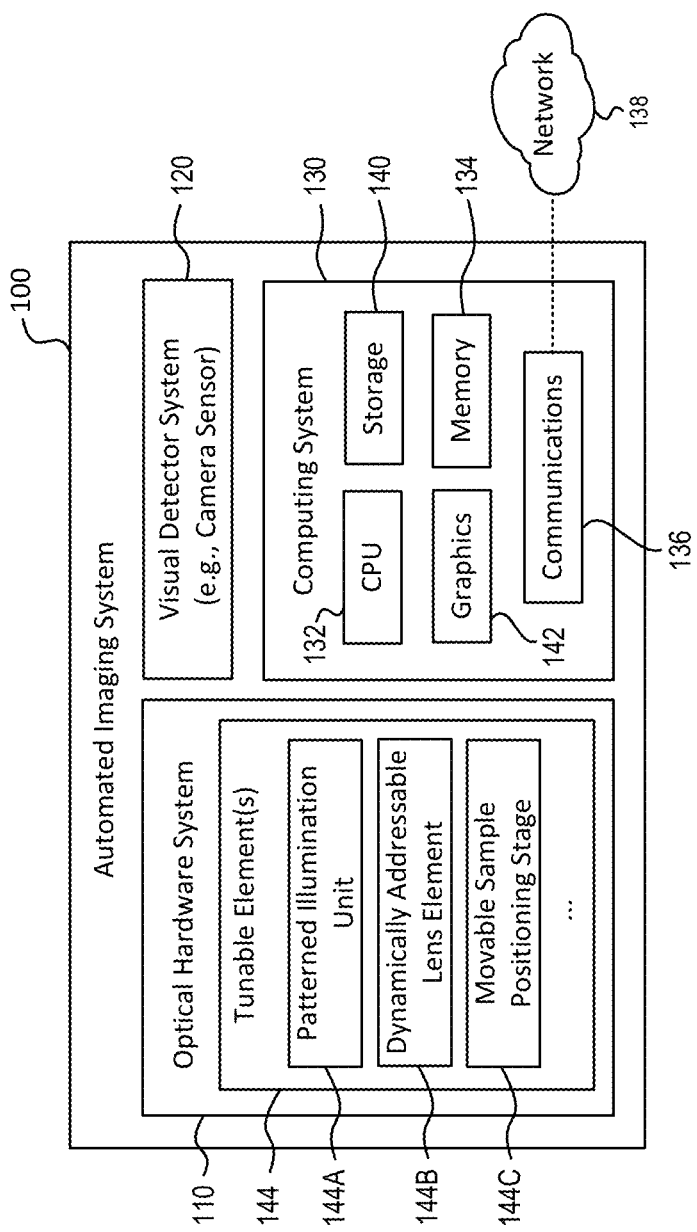
FIG. 1 is a schematic illustration of an automated imaging system according to one embodiment of the present disclosure.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that, in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are considered to be expressly stated in this disclosure.

Unless otherwise defined, all technical terms used herein have the same meaning as commonly understood by one of ordinary skill in the art to which this disclosure belongs.

Medical imaging of biological materials, such as blood smears, is typically performed by trained technicians and pathologists. Each sample must be painstakingly observed and analyzed through a combination of human judgement and tool assistance. The automated imaging system disclosed herein simplifies this process by scanning of large sample areas and using artificial intelligence to dynamically change the imaging environment to optimize detection. The system can be trained to recognize and report a variety of prescribed analytes, which can improve the speed and accuracy of diagnoses.

FIG. 1 is a schematic illustration of an automated imaging system 100 (also referred to as "imaging system 100") according to an embodiment of the present disclosure. The imaging system 100 includes an optical hardware system 110, a visual detector system 120, and a computing system 130.

The optical hardware system 110 may include various components required to obtain images, such as illuminator (e.g., LED array, LCD display, or anything that can illuminate a sample); a stage to hold the sample in question; a lens system including a light gathering element (e.g., microscope objective lens, electro-tunable lens) and, optionally, various filter elements including amplitude and/or phase masks.

The visual detector system 120 may include one or more cameras, visual sensors, and associated software applications. An exemplary camera with a CMOS sensor includes an Ace® acA1920-25 Gm® Monochrome GigE Camera, available from Basler AG of Ahrensburg, German. An exemplary camera with a single-photon avalanche diode (SPAD) array includes an SPC3®, available from Micro Photon Devices S.r.l., of Bolzano, Italy.

The optical hardware system 110 and visual detector system 120 may be configured for multiple imaging modalities, e.g., brightfield, darkfield, refractive index (RI), phase contrast, and/or fluorescence. As described in detail below, the computing system 130 may be able to control which modality is used at any given moment, and the change in modality is possible at any time using programmable components, which are controlled by the computing system 130. In some embodiments, the imaging system 100 may computationally generate a virtual image representing what the image would look like in a certain modality without actually capturing an image in that modality.

In some embodiments, the computing system 130 may be controlled by a central processing unit (CPU) 132 or other processing device, such as a microcontroller, digital signal processor (DSP), application specific integrated circuit (ASIC), field-programmable gate array (FPGA) or like device. The CPU 132 may execute instructions stored in a memory 134, which may be implemented using any suitable combination of non-transitory computer-readable media, such as random access memory (RAM), read-only memory (ROM), electronically erasable programmable read-only memory (EEPROM), or the like.

The computing system 130 may further include a communications interface 136 for connecting the computing system 130 to a network 138, such as a local area network (LAN) and/or wide area network (WAN), including the Internet. The communications interface 136 may implement any suitable network protocols using a wireless or wired transmission medium. In some embodiments, the connection to the network 138 may facilitate updates, adding to the imaging modalities available on the imaging system 100, as well as the tasks the imaging system 100 is able to perform. The components of the computing system 130 and/or multiple computing systems 130 can be networked to perform a task or portions of a task in a distributed manner.

The computing system 130 may also include a storage device 140, such as a hard disk drive (HDD), solid-state drive (SSD), and/or or optical storage unit, for long-term storage of data and/or application programs. The storage device 140 may be local to the computing system 130, as shown, or could be implemented remotely using a cloud architecture.

The computing system 130 may further include a graphics interface 142 to display graphical images, graphical user interfaces (GUIs), and the like, on a display device, such as a computer monitor (not shown). Those skilled in the art will recognize that the various components described above may be implemented in separate devices, local or remote, that work in concert to perform the operations disclosed herein.

One way in which the disclosed imaging system 100 differs from conventional microscopic systems is that optical hardware system 110 includes one or more "tunable" hardware elements 144. The elements that define the visual environment of the sample can be changed for not only focusing and illumination, but can also be optimized for extracting specific information from a sample. This tuning can be performed iteratively using an artificial intelligence algorithm, which is described in further detail below.

In one embodiment, at least one component of the optical hardware system 110 includes a tunable element 144, while two or more tunable elements 144 may be provided in some configurations. Non-limiting examples of tunable elements 144 of the optical hardware system 110 may include a patterned illumination unit 144A, a dynamically addressable lens element 144B, and a movable sample positioning stage 144C.

The patterned illumination unit 144A can be tuned to illuminate the sample with light that exhibits a varying brightness over position, angle, spectrum, phase, and polarization. In some embodiments, the patterned illumination unit 144A may be embodied as a programmable LED array, such as a DotStar® High Density 8×8 Grid-64 RGB LED Pixel Matrix, available from Adafruit Industries of New York, New York.

The dynamically addressable lens element 144B, such as an electro-tunable lens, can be tuned by varying the composition of light within the chain of imaging optics between the sample and the visual detector system 120. One example of a dynamically addressable lens element 144B may include an Optotune® tunable lens, available from Optotune Switzerland AG of Dietikon, Switzerland.

The movable sample positioning stage 144C may provide up to six degrees of freedom to adjust the rotational and translational position of the sample. The movable sample positioning stage 144C may include an x-y translation stage and/or a z-stage for focusing. A non-limiting example of a movable sample positioning stage 144C may include a MLS203-1® stage available from Thorlabs, Inc. of Newton, New Jersey.

These tunable elements 144 are intended to be merely exemplary; other suitable tunable elements 144 may include, without limitation, generators/analyzers for polarization, digital micromirror (DMD) arrays, liquid crystal displays, deformable mirrors, spatial light modulators, and the like. Together, these tunable elements 144 provide a large array of variables that can be adjusted to provide an imaging environment that is ideal for detecting a particular analyte.

As described in detail below, these dynamically tunable elements 144 can be optimized to reduce a task-specific loss function over a large set of captured image data, which for supervised learning algorithms may also include a human-annotated label.

As will be appreciated by a person of skill in the art, some elements of the disclosed system can be embodied as a method, a system, or a computer program product. For example, the computational algorithm 206 and computing system 130 can take the form of hardware (including processors, memory devices, displays, etc.), software (including firmware, resident software, micro-code, app, etc.) or an embodiment combining software and hardware aspects. Additionally, it is to be understood that the computational software can be housed in the imaging system 100, or it can be remotely located. Likewise, the components of computing system 130 can be partially or fully housed locally in the imaging system 100, or they can be accessed remotely by the hardware components. For example, some components may be implemented using a cloud architecture. The system can further be connected to a communications network for transmitting and/or storing any associated information (e.g., raw or processed images, metadata, analysis results, etc.) remotely (e.g., a data center).

According to one aspect of the present disclosure, a single system can be configured for multiple different types of analyses while maintaining optimal conditions for each. If new categories are introduced, the dynamically tunable elements 144 can be changed solely through software control of the layers, without the need to physically replace any component. By changing the controlling parameters of the hardware (i.e. changing the physical layer) and changing the computational algorithm in the digital layer, numerous optimization profiles are possible. Nonetheless, it is envisioned that the optics can be provided as modular or switchable components in order to increase the range of imaging capabilities.

Figure 2:
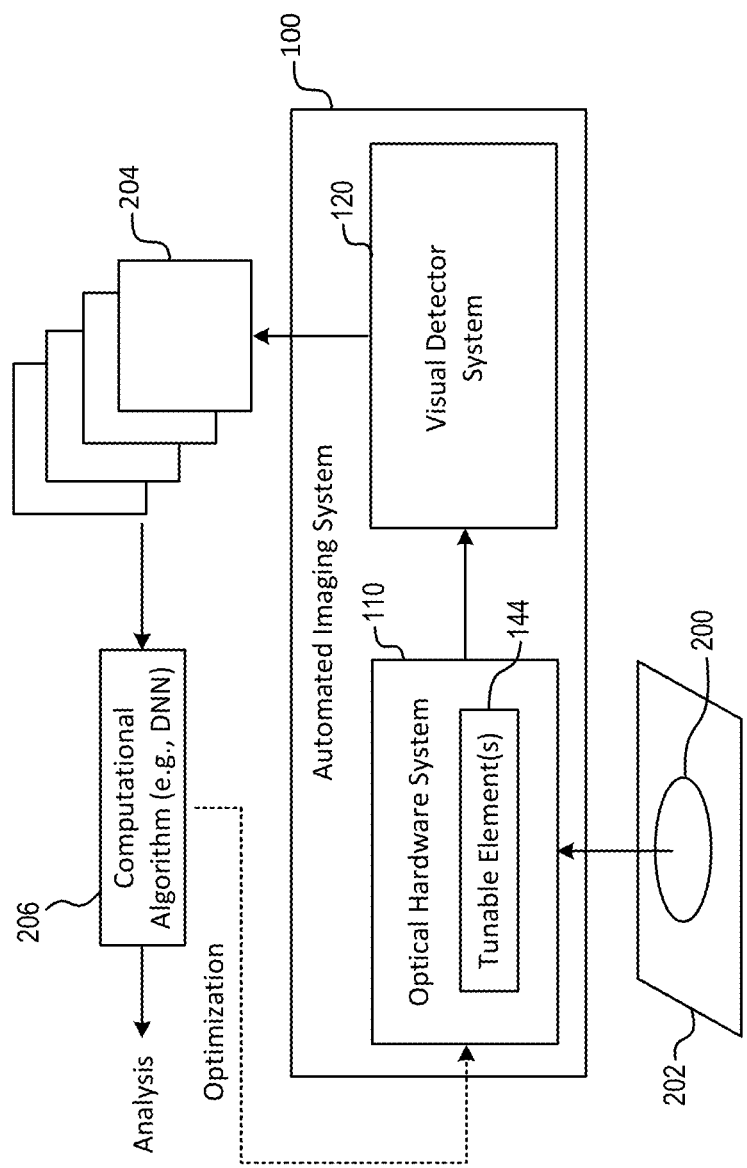
FIG. 2 is an example workflow according to one embodiment of the present disclosure, FIG. 3 a schematic of a computational method according to one embodiment of the present disclosure.

FIG. 2 is a schematic of an example workflow according to the present disclosure. A biological sample 200 is placed on a sample stage 202 and an image 204 is captured by the automated imaging system 100, including the optical hardware system 110 and visual detector system 120, described with reference to FIG. 1. The acquired image 204, along with its associated data, is then processed by a computational algorithm 206 into an automated decision. In some embodiments, the computational algorithm 206 can be an artificial intelligence algorithm, such as supervised machine learning algorithm, which may include a Deep Neural Network (DNN), Convolutional Neural Network (CNN), or the like. In some embodiments, other forms of artificial intelligence may be used, such as fuzzy systems, evolutionary computing (e.g., genetic algorithms, differential evolution), metaheuristic and swarm intelligence, probabilistic methods (e.g., Bayesian networks, Hidden Markov models, Kalman filters), inverse problems, linear or non-linear optimization, and/or algorithms for computer vision.

The computational algorithm 206 may operate on (or be accessible to) the computing system 130 of FIG. 1. The automated decision may be to detect objects or features of interest within the microscope slide, optionally within a blood smear. Learning can occur in real time or in reference to a prescribed training data set, as described in detail below.

Image processing can include conventional image processing, such as classification of cells, detecting abnormal cells, counting various bodies/agents/cells, providing digital staining, and measuring sizes, among others. Additionally, the same algorithm can be used to change the parameters of one or more tunable elements 144. Two processing streams can be referred to as "digital layers" and "physical layers,"

respectively. In the imaging system 100, the same computational algorithm 206 that is used for the digital layer can also be used to optimize the hardware. For example, computational algorithm 206 can establish task-specific optimized settings for its dynamically addressable lens element(s) 144B (shown in FIG. 1). Once task-specific optimized settings are determined by the computational algorithm 206, the imaging system 100 then updates its dynamically addressable lens element(s) 144B with the task-specific optimized settings before the acquisition of new image data.

As used herein, "optimized" can refer to the minimization of error, or loss, in the analysis. The converged weights in the model of the physical layer can be used to determine the parameters of the actual hardware. In other words, the physical hardware settings can be predicted and changed to expose sample features that are important for classification, and thus achieve the highest possible quality of acquired image data.

Figure 3:
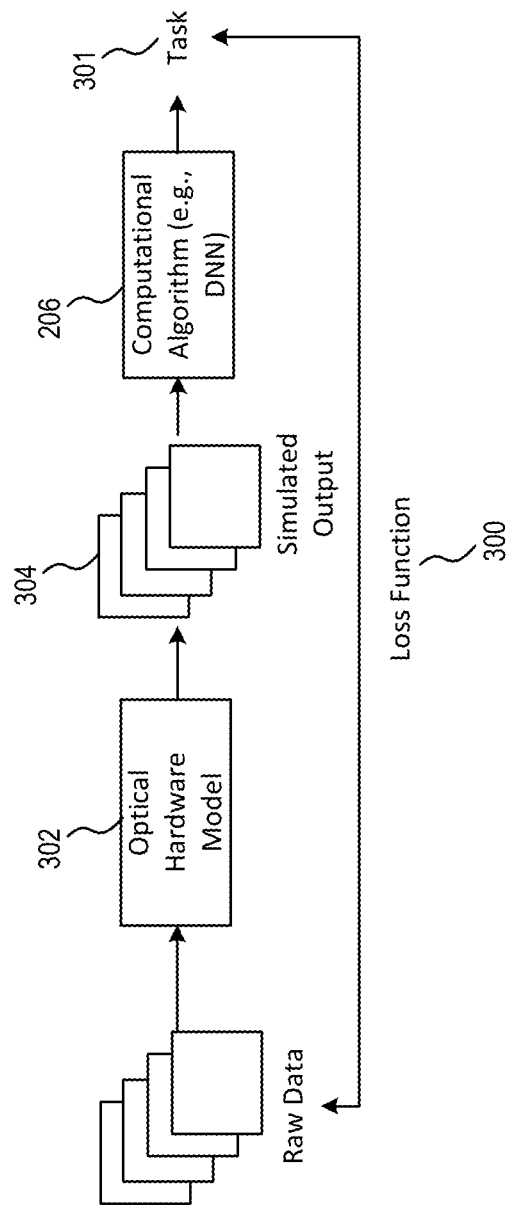

This process is schematically illustrated in FIG. 3, which describes an approach to training the combined hardware/software model. In this example embodiment, the system can be optimized to reduce a task-specific loss function 300 (e.g., error in classification) for a given task 301 in an end-to-end manner by simulating the optical hardware as physical layers (optical hardware model 302) and then adding the computational algorithm 206 (e.g., DNN) as the digital layers in a network. In operation, the optical hardware is tuned accordingly to mimic the converged optical hardware model 302 and the resulting simulated output 304. This simulated output 304 is fed into the previously trained computational model 206 or the digital layer.

In some embodiments, the task 301 may be to obtain images or may go beyond simply obtaining human consumable images, such as by identifying if an infection is present or not, counting cells, etc. The computing system 130 uses the computational algorithm 206 to process the raw measurements to perform the task. The computational algorithm 206 may also have a feedback loop, which informs the system about the optimal settings for the programmable components. The system may be able to perform various tasks (one at a given instant), and the user can choose the task to be performed by interacting with the computing system 130, either via an input device or through programming, In some embodiments, imaging system 100 can perform automated scanning in multiple steps of increasing resolution. This can advantageously save scanning and processing time. In a non-limiting example, the imaging system 100 can perform automated scanning of a specimen in low-resolution (e.g., 10× magnification) and then perform computational processing of the low-resolution images. Based on regions of interest that are identified by the low-resolution data, the system can pinpoint particular areas of interest, which can then be further imaged at a higher resolution (e.g., 40× magnification). In some embodiments, this can be accomplished with a movement system, such as a translation stage, which can position the sample under an adjacent lens system or move the feature of interest back into field of view. This information can then be subsequently used to improve the accuracy of the computational method's automated decision. Scanning resolution can further be employed as a tool for additional computational processing or for local inferencing.

Similarly, the magnification level can be increased or decreased in a step-wise or continuous manner to track changing objectives. Imaging system 100 can have different optical configurations such as the back-to-back objective or back-to-back lenses to obtain desired magnification of the system. An automated motorized focus can communicate with computing system 130 and computational algorithm 206, the data from which can be included in the automated decision.

Figure 4:
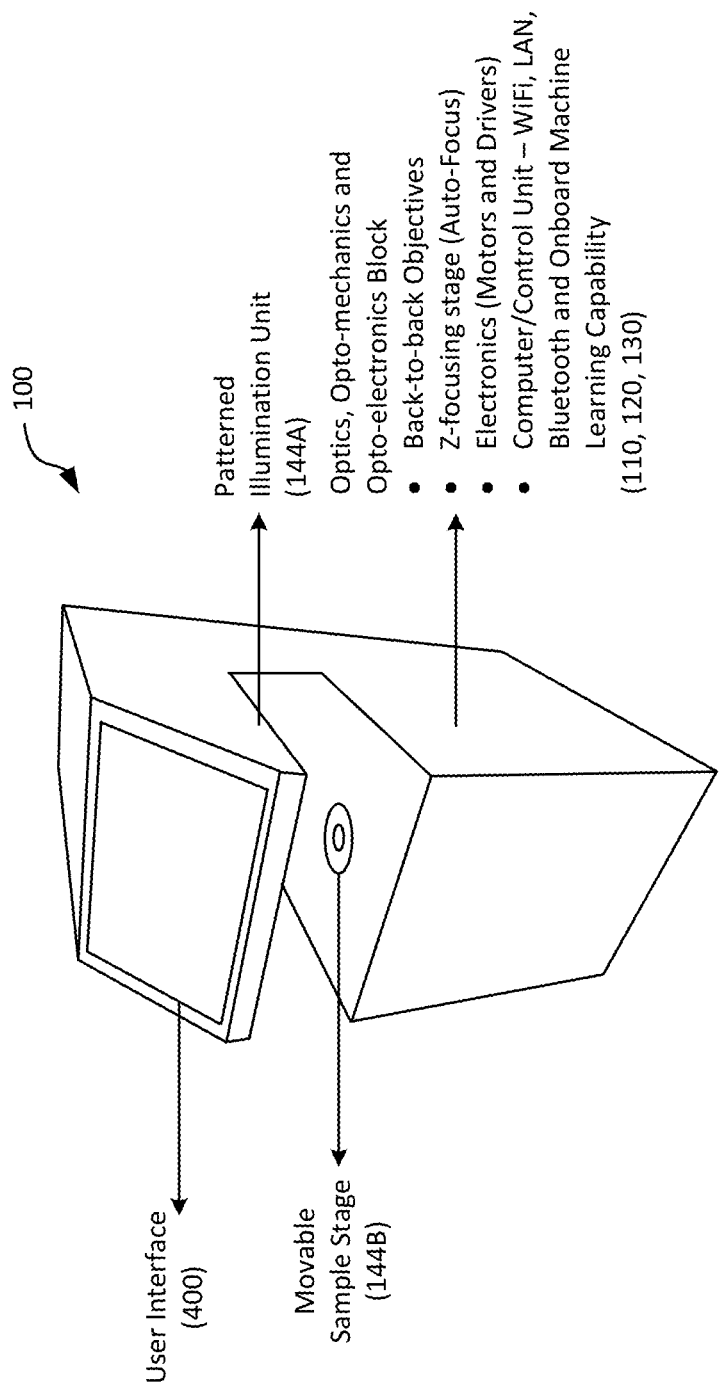
FIG. 4 is an automated imaging system according to another embodiment of the present disclosure.

FIG. 4 depicts an example embodiment of the imaging system 100, including exemplary elements for optical hardware system 110 (e.g., a patterned illumination unit 144A and movable sample positioning stage 144B), visual detector system 120, and computing system 130. In this embodiment, the imaging system 100 includes a user interface 400, which allows a user to control the imaging system 100. In this case, the user interface 400 is in the form of an incorporated touch screen. However, it is to be understood that the user interface can include any suitable elements, such as input/output devices, display monitor, tablet, mobile device, wireless connection to a remote screen, software applications, etc. In some embodiments, the imaging system 100 also includes a sample loading system (not shown) for automated scanning of more than one sample. It is further possible to link multiple systems together via a sample conveyance system, such that the specimen sample loader can dispense specimen samples to the interconnected systems for analysis of a large number of specimens.

Figure 5:
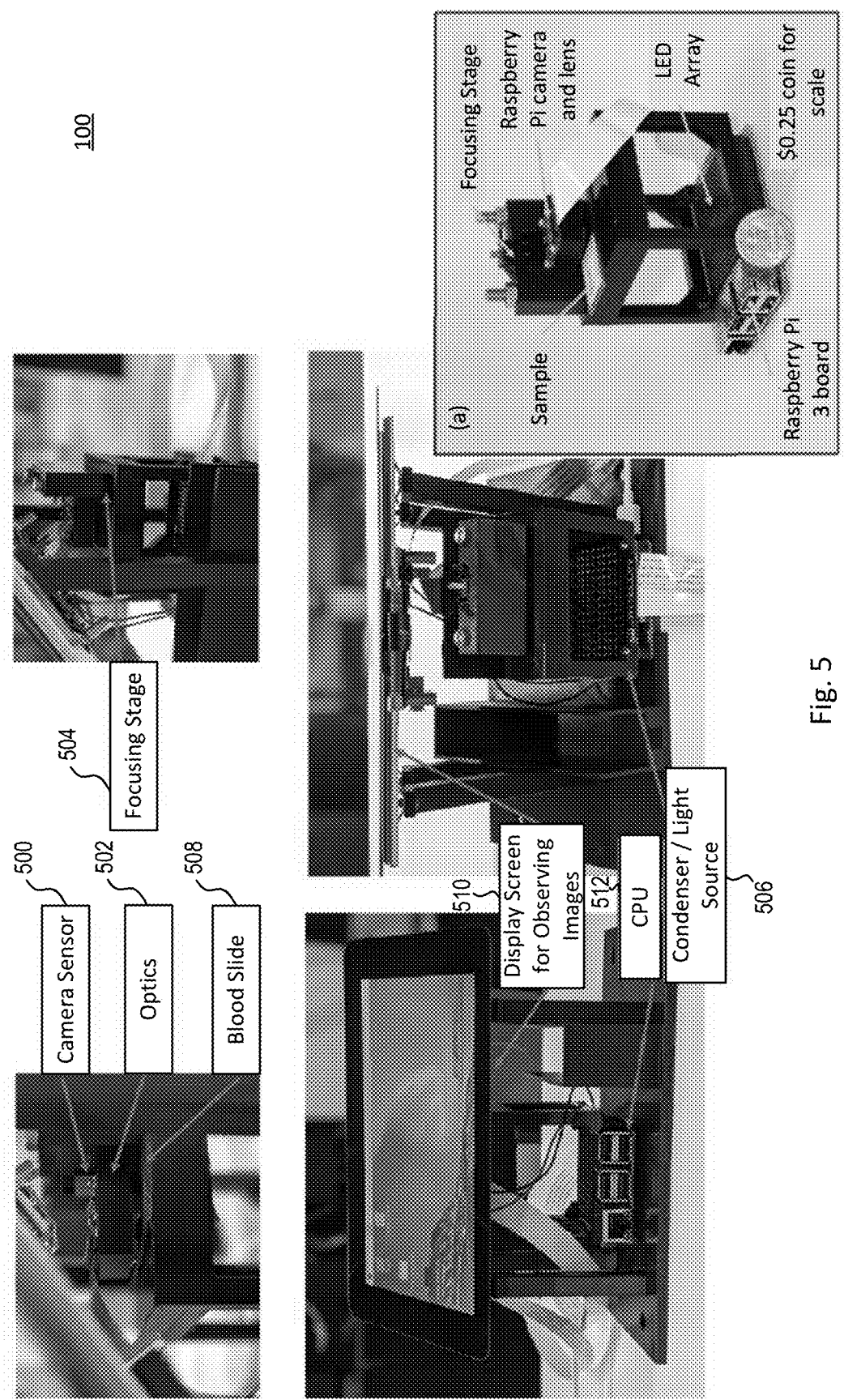
FIG. 5 is an automated imaging system according to another embodiment of the present disclosure.

FIG. 5 shows multiple views of another embodiment of imaging system 100. Inset (a) is a detailed view of the system excluding the screen. Here, the unique aspect of the compact size and portability of imaging system 100 can be seen, particularly compared to conventional systems having similar capabilities. In some embodiments, imaging system 100 can occupy a volume of less than 300 cm3.

Also illustrated in FIG. 5 are a camera sensor 500, optics 502, and focusing stage 504, and light source (or condenser) 506, one or more of which may be dynamically tunable in various embodiments, in addition to a blood slide 508, display screen 510 for observing images, and CPU 512.

Figure 6:
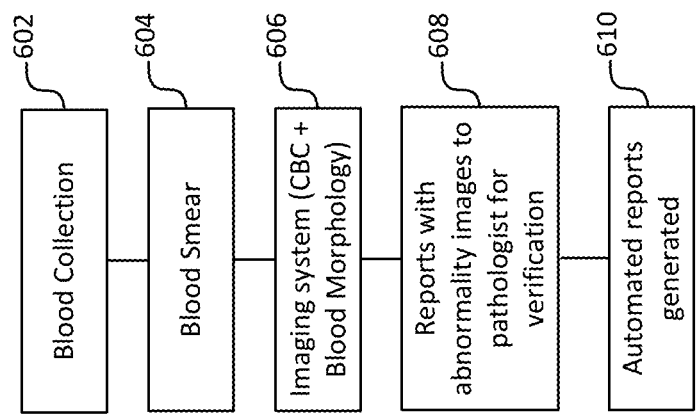
FIG. 6 is an example workflow according to one embodiment of the present disclosure.

Another aspect of the present disclosure is a method of detection, identification, classification and/or diagnosis of features of interest in biological samples. An example workflow is illustrated in FIG. 6. After a biological sample (e.g., blood) is collected 602 and prepared 604 (e.g., smeared), it is placed 606 in the automated imaging system (e.g., 100). As described with reference to FIG. 2, the optical hardware system (e.g., 110) and visual detector system (e.g., 120) cooperate to create an image of the sample. This information is then processed using the artificial intelligence algorithm (e.g., 206), and the one or more tunable elements (e.g., 144) of the optical hardware system (e.g., 110) is/are dynamically adjusted as needed to maximize detection of the feature of interest. The imaging system 100 learns to discern between samples that do and do not possess the feature, which can then be reported 608 to a practitioner (e.g., pathologist) for verification. If desired, this verification or rebuttal can be incorporated into the algorithm for iterative results. An automated report, which can include images, results, etc., can then be generated 610.

Thus, the disclosed imaging system 100 advantageously has reduced dependency on trained human intervention to interpret findings and can connect pathologists to remote laboratories. The system is robust and can be made in a modular fashion for simplified maintenance. Additionally, unlike many conventional systems, it does not require additional chemical reagents. Hence, the system may be particularly useful in areas with limited human and financial resources.

Non-limiting examples of features of interest include the presence of viruses, such as malaria or tuberculosis, segmenting nuclei, detecting and counting white blood cells, detecting tumors from tissue, analysis of various cytology slides, etc. Additionally, the automated imaging system 100 can be useful for biologists and biomedical engineers for in vitro imaging applications. One example includes the analysis of healing microbeads placed inside tissue.

FIGS. 7A-7D illustrate an exemplary embodiment according to the present disclosure that uses patterned illumination the diagnosis of malaria. Human-based analysis of light microscope images is still the diagnostic gold standard for this disease in resource-limited settings. Due to their small size (approximately 1 μm diameter or less), the malaria parasite (*Plasmodium falciparum* or "*P. falciparum*") must be visually diagnosed by a trained professional using a high-resolution objective lens (typically an oil immersion objective lens). Unfortunately, it is challenging to create high-resolution lenses that can image over a large area. The typical field-of-view of a 100× oil-immersion objective lens is 270 μm in diameter, which is just enough area to contain a few dozen cells. As the infection density of the malaria parasite within a blood smear is relatively low, to find several examples for a confident diagnosis, a trained professional must scan through 100 or more unique fields-of-view (FOVs). A typical diagnosis thus takes 10 minutes or more for an expert, leading to a serious bottleneck at clinics with a large number of patients and few trained professionals. While the analysis process can be automated, for example by developing algorithms, such as a convolutional neural network, to detect abnormalities within digitally acquired images, a significant bottleneck still remains in the data acquisition process—human-centered microscope designs still must mechanically scan across the sample to capture over 100 focused images, which each must then be processed before it is possible to reach a confident diagnosis.

In one embodiment, a modification to a standard light microscope 704 is provided that can improve the speed and accuracy of disease diagnosis (e.g., finding *P. falciparum* within a blood smear, or tuberculosis bacilli within a sputum smear), without dramatically altering the standard image-based diagnosis process. In this embodiment, a tunable element (i.e., programmable LED array 702) is added to the microscope 704, which allows illumination of samples of interest under a wide variety of condition. The embodiment also employs a computational algorithm, such as a learning sensing network (LSN) 706 (which may include a convolutional neural network or "CNN") that is jointly optimized to automatically detect the presence of infection, and to simultaneously generate an ideal LED illumination pattern to highlight sample features that are important for classification.

In the present example, the microscope 704 is optimized to sense, for example, the presence or absence of a malaria parasite, as opposed to forming a high-resolution image of each infected blood cell. By learning task-optimized hardware settings, classification accuracies exceeding 90 percent are achievable using large field-of-view, low-resolution microscope objective lenses, which can see thousands of cells simultaneously, as opposed to just dozens of cells seen in the current diagnostic methods using a high-resolution objective lens. This removes the need for mechanical scanning to obtain a diagnosis, reducing analysis time and increasing diagnostic accuracy.

While standard bright-field microscope images are often useful for humans to interpret, these images are likely sub-optimal for a computer to use for automated diagnosis. Transparent samples like blood cells will exhibit little contrast under bright-field illumination and can be examined with greater accuracy using alternative illumination schemes. Techniques such as dark-field illumination, differential phase contrast imaging, multispectral imaging, and structured illumination can help extract additional information from such samples and can thus increase the accuracy of automated processing. However, it is not clear in advance what particular form of illumination might be optimal for a particular machine learning task. For example, the detection of *P. falciparum* within blood smears might benefit from one spectral and angular distribution of incident light, which will likely differ from what might be required to optimally find tuberculosis within sputum smears or to segment a histology slide into healthy and diseased tissue areas.

To address this problem, an artificial intelligence algorithm performs image classification and determine optimal illumination schemes to maximize image classification accuracy. The learned sensing approach of FIG. 7 uses a CNN that is enhanced "physical layers," which model the physically relevant sensing parameters to be optimized—here, the variable brightness of the LEDs in the programmable LED array 702 placed beneath the sample plane of the microscope 704. The physical layer concept can help to optimize a variety of different experimental parameters, such as the imaging system pupil, polarization properties, spatial and spectral sampling conditions, sensor color filters, etc.

Of course, those of skill in the art will recognize that other tunable elements may be used in addition to the programmable LED array 702 (patterned illumination unit 144A of FIG. 1). For example, the automated imaging system 100 may include a dynamically addressable lens element 144B (e.g., electro-tunable lens), a movable sample positioning stage 144C, or the like. Therefore, while the present example is specific to a patterned illumination unit 144A, this should not be considered a limitation of the automated imaging system 100.

Furthermore, for simplicity, optimization in the present example is limited to the brightness of the individual LEDs in the array and their three spectral channels (i.e., blue, green and red LED active areas). However, in other embodiments, a variety of other parameters or variables may be used. Once these weights are optimized, they define the best distribution of LED brightness and color for illuminating a sample to achieve a particular inference task (e.g., classification of the malaria parasite). The latter weights within the network make up its "digital layers" and perform a specific task of mapping of each of the uniquely illuminated images to a set of classification probabilities. The weights within both the physical and digital layers are jointly optimized using a large training dataset via standard supervised learning methods.

The present embodiment includes dynamically controllable hardware and is thus not coupled to a fixed optimized optical design. In other words, the optimized illumination pattern in microscope 704 can change to better highlight different samples under inspection. This allows the microscope 704 to capture category-specific sample features either of the *P. falciparum* malaria parasite, or of tuberculosis bacilli, for example, as each exhibits a different volumetric morphology and often appears within a unique spatial context. Since the LED array 702 is programmable, the optimal illumination pattern can be changed without the need to physically replace hardware.

As noted above, while the physical layers of the learned sensing network 706 may take on a variety of different forms, the present embodiment for LED illumination optimization uses one physical layer. In the absence of noise, the image formed by turning on multiple LEDs is equal to the digitally computed sum of the images formed by turning on each LED individually (since the LEDs in the array are mutually incoherent). Similarly, the image of a sample illuminated with a broad range of colors (i.e., different optical wavelengths) can be formed by summing up images where each color was used to separately illuminate the sample. Thus, it is possible to digitally synthesize images under a wide range of illumination conditions by computing a weighted sum of images captured under illumination from each and every colored LED within the LED array 702. If the brightness of the nth LED in the array is denoted as wn, and the associated image formed by illuminating the sample with only this LED at a fixed brightness is In, then the image formed by turning on a set of N LEDs at variable brightness levels and/or spectral settings is, $$I' = \Sum_{n=1}^{N} w_n I_n.$$  Eq. (1)

Accordingly, the physical layer contains a set of learned weights $w_n$, for $n \in [1, N]$, that are each multiplied by their associated image and summed. A 4-layer CNN, connected within the same network, may subsequently classify this summed image into one of two categories (infected or not infected). The complete learned sensing CNN for illumination optimization is summarized in Algorithm 1.

Algorithm 1 Learned sensing based network for optimized microscope illumination
  1: Input: $\{I_{j,n}\}$ with $n \in \{1, \ldots, N\}$ uniquely illuminated images of the jth object, object labels $\{y_j\}$. Number of iterations T. An image classification model F parametrized by 0.
  2: Randomly initialize the LED weights $w = \{w_n\} N_n = 1$.
  3: for iteration $t = 1 \ldots, T$ do
  0: Sample a minibatch of $(\{I_{j,n}\} N_n = 1, y_j)$,
  1: Generate each pattern-illuminated image $I_j'$ via the weighted sum $I_j' = \text{IN}_n = 1 W_n I_{j,n}$
  2: Take a gradient descent step on CrossEntropy($F(I_j')$, $y_j$) with respect to wand 0.
  4: end for
  5: Output: the optimized LED weights wand the model parameters 0.

Unlike standard classification methods, which typically train with images under uniform illumination, the above-described network employs a set of N uniquely illuminated images $\{In\} Nn = 1$ per training example. Once network training is completed, the inference process uses just one or two optimally illuminated low-resolution images. Multiplexed image acquisition or other more advanced methods may also be used to reduce the total amount of acquired training data per example. At the same time, capturing this data overhead is only required once, for the training dataset. After network training, the optimized physical parameters (the LED brightnesses and colors) can then be used on the same or on different setups to improve image classification performance.

In the present example, all machine learning optimization is performed with Tensorflow, an open source library available from www.tensorflow.org. To process each type of data, the cross-entropy metric is used, trained with 25k iterations with a batch size of 50 and applied dropout before the final layer. Gaussian random weight initialization is used for all weights, except for optimization of RGB weights. All reported results use Adam Optimization with a step size of 10-3 and the following parameters: $\beta 1 = 0.9$, $\beta 2 = 0.999$ and $\varrho = 10\text{-}8$.

In one embodiment, the CNN contains 5 layers, which proceed as follows: layer 1 (physical layer) is a tensor product between a 28×28×N input and a 1×N weight vector w, layer 2 uses a 5×5 convolution kernel, 32 features, ReLU activation and 2×2 max pooling, layer 3 uses a 5×5 convolution kernel, 64 features, ReLU activation and 2×2 max pooling, layer 4 is a densely connected layer with 1024 neurons and ReLU activation and layer 5 is densely connected readout layer. In one embodiment, dropout may be applied with a probability of 0.5 between layers 4 and 5. N=28 for the single-color optimization trials and N=84 for the multispectral optimization.

FIG. 7A illustrates optimal single-color illumination patterns determined by the example CNN for thin-smear malaria classification (average over 15 trials). Row (a) shows an optimized LED arrangement determined using only the red spectral channel exhibits negative (Pattern 1) and positive (Pattern 2) weights that lead to two LED patterns to display on the LED array, recording two images which are then subtracted. Variance over 15 independent runs of the network's algorithm shows limited fluctuation in the optimized LED pattern. Rows (b) and (c) are the same (a), but using only the green and blue spectral channels, respectively, for the classification optimization. Dashed line denotes bright-field/dark-field cutoff.

FIG. 7B illustrates optimal multispectral illumination patterns determined by the CNN for thin-smear malaria classification (average over 15 trials). Learned sensing optimization is jointly performed over 3 LED colors and 28 LED locations simultaneously, yielding two unique spatio-spectral patterns that produce two optimally illuminated images for subtraction.

FIG. 7D includes example images of individual thin-smear blood cells under different forms of illumination. The top two rows are negative examples of cells that do not include a malaria parasite; the bottom two rows are positive examples that contain the parasite. Example illuminations include from (a) just the center LED, (b) uniform light from all LEDs, (c) all LEDs with uniformly random brightnesses, (d) a phase contrast-type (PC) arrangement, (e) an off-axis LED, (f) a phase contrast (PC) ring, (g) optimized pattern with red illumination, (h) optimized multispectral pattern, and (i) the same as in (h) but showing response to each individual LED color in pseudo-color, to highlight color illumination's effect at different locations across the sample.

In the present example, images under illumination from positively and negatively weighted LEDs are formed by capturing and subtracting the two images. Single-color optimized patterns for the red channel exhibit the lowest signal-to-noise ratio out of all three spectral channels, due to the use of lower power for the red LEDs and the relative low-contrast of the blood cells in red, which mostly disappears when optimization is additionally performed over the green and blue spectral channels. The average false positive rate and false negative rate breakdown for the single-color optimized results was 2.91% and 11.14%, respectively (averaged over 15 independent trials and 3 separate colors). For the jointly optimized LED position and color results, the false positive/false negative rates were 2.96% and 8.87%, respectively.

Figure 8:
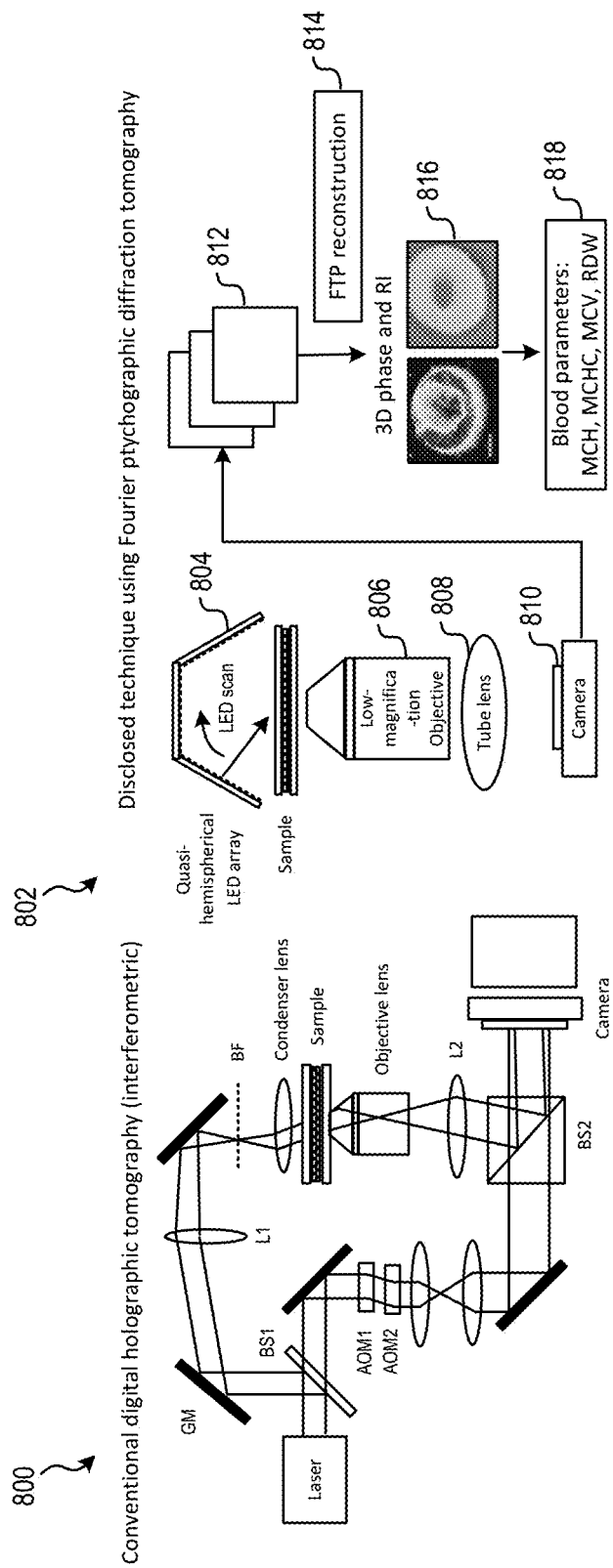
FIG. 8 illustrates another exemplary embodiment according to the present disclosure for determining blood parameters.

FIG. 8 illustrates yet another embodiment of the present disclosure for determining various parameters from a sample of blood that cannot normally be determined from a microscope image.

With the advancement of digital microscopy, it is now possible to count different types of blood cells from peripheral blood smear (PBS) digital images. Hence, digital microscopes can potentially replace the automated hematology analyzers (AHAs) used for cell counting and remove the need for two separate devices. However, parameters such as mean corpuscular Hb concentration (MCHC), mean corpuscular Hb content (MCH), mean corpuscular volume (MCV), and RBC distribution width (RDW) cannot be obtained from a microscope image. This requires adding additional equipment on to the microscope to obtain these parameters increasing the cost and complexity of the device.

Optical diffraction tomography (ODT) can be used to infer the refractive index of the sample, in addition to the tomographic (3D volumetric) information generated. The refractive index and the tomographic information can be used to infer the MCHC, MCH, MCV, and RDW of a blood smear, filling the missing CBC data from a PBS digital image. A tomogram is a 3D image of the sample; hence it does contain the cell morphology information that is present in a PBS digital image (a 2D absorption image of the sample). Thus, replacing a regular digital microscope with a diffraction tomographic microscope for PBS analysis can also provide a CBC report.

Diffraction tomography requires obtaining the phase information of the light, which is lost when the light is detected by a camera. As shown in FIG. 8, conventional digital holographic (interferometric) systems 800 are commonly used to obtain this phase information and hence recover the tomogram. However, these systems 800 use lasers, high-resolution imaging optics, and need very precise alignment, which increases the complexity of the system 800 and the cost. These systems 800 are also very slow since only a small field-of-view (FOV) can be captured at once.

One embodiment of the present disclosure includes a Fourier ptychographic tomography (FPT) system 802, in which the illumination source of a standard pathology microscope is replaced with a quasi-hemispherical LED array (or "LED array") 804, which simplifies the FPT system 802, allowing for a miniaturized low-cost optical system for commercial use.

Current digital pathology microscopes use incoherent illumination and hence cannot capture the useful phase and 3D information about the sample. This prevents them from obtaining the physical and chemical properties about the blood sample and thus, cannot be used as a complete blood testing solution. Optical diffraction tomography can overcome this limitation, but existing diffraction tomography methods are challenging to implement in a commercial system. Accordingly, the present uses the LED array 804 to perform Fourier ptychographic tomographic (FPT) imaging for blood analysis.

In some embodiments, the FPT system 802 includes a relatively low-magnification (e.g., 20×) objective lens 806, a tube lens 808, and camera 810 with a CMOS sensor. The camera 810 may include an Ace® acA1920-25 Gm® Monochrome GigE Camera, available from Basler AG of Ahrensburg, German. Examples of objective lenses 806 may include, without limitation, Olympus® Plan Achromatic Objectives, available from Olympus Corporation of Tokyo, Japan.

CT (computed tomography) scans are widely used in radiology. However, they are aimed at imaging a whole human body or organs at mm-scale resolution. The disclosed system 802 introduces a tomography approach to digital pathology where cm-scale fields-of-view need to be imaged at sub-micron resolution. A CT scan has an X-ray source mounted on a ring with a detector on the other end. The X-ray source and the detector are rotated around the ring to capture images from different angles of the sample.

In ODT and FPT, by contrast, the sample is illuminated from multiple angles and corresponding images 812 are captured. These images 812 are processed using FTP reconstruction algorithms 814 to generate 3D volumetric images 816 of the sample. In ODT and FPT, the detector is not rotated, since the imaging systems 802 in microscopy usually have much higher NA than a CT scanner, and they both use different reconstruction methods.

In the disclosed FPT system 802, the LED array 804 is quasi-hemispherical and provides 360° illumination. The 3D phase is normally calculated using an iterative algorithm 814 using the multiple images captured under different illumination angles using techniques similar to those described with reference to FIGS. 7A-7D. Using the recovered 3D phase and refractive index, it is possible to calculate cell volumes and chemical properties. Systems and methods for performing Fourier ptychographic tomography are disclosed, for example, in U.S. Pat. No. 10,665,001, issued May 26, 2020, for "Fourier ptychographic tomography," which is incorporated herein by reference.

After obtaining a high-resolution phase map and the refractive index quantitative information about the individual red blood cells is extracted. This will help obtain four of the commonly used chemical and mechanical blood parameters 818, e.g., MCHC, MCV, MCH, and RDW. To calculate the individual cell parameters, an open source software program, such as the CellProfiler, available from cellprofiler.org, may be used. Thereafter, for each individual cell, the hemoglobin concentration, volume, and area are calculated. In one embodiment, a simple classification system may be used to group Red and White blood cells based on the volume and other features identified in the phase images.

It can be assumed that a red blood cell interior is completely occupied by water and hemoglobin due to the lack of a nucleus and cell organelles. Therefore, a linear relationship between the refractive index of the cell and the concentration of hemoglobin may be expressed as: $n_{rbc}-n_0=\beta C_{Hb}$, where $n_{rbc}$ is the measured RBC refractive index, $n_0=1.335$ is the refractive index of the cell in absence of hemoglobin and $\beta=0.0019$ dL g$^{-1}$ for hemoglobin. Therefore, from the refractive index map, the Hemoglobin concentration $C_{Hb}$ may be calculated for each blood cell. The MCHC is then obtained by averaging $C_{Hb}$ over all the cells in the sample. For patients with anemia, the MCHC falls below the normal range. Assuming a conservative $C_{Hb}$ of 27 gdL$^{-1}$, the system may detect a refractive index difference of 0.051.

The phase information several physical parameters for cells to be calculated. The first parameter is the projected area (PA), which can be obtained by multiplying the number of pixels of each cell with the pixel area. Then, the phase map is converted to a thickness map using the wavelength and refractive index information. The volume of each cell is calculated by integrating the thickness of the projected area. The surface area of individual cells is determined using Monge parameterization. From the surface area and volume, parameters, such as sphericity, may be calculated. Furthermore, for each cell, it is possible to simultaneously calculate many other independent parameters, including perimeter, circular diameter, eccentricity, minimum, maximum, and mean thickness, circularity, and variance for cell height distribution. By averaging the cell volumes over all observed cells, MCV may be obtained. The width of the cell volume distribution curve is the RBC Distribution Width (RDW). Finally, MCH is derived by combining MCHC and MCV as MCH=MCV×MCHC×0.01. It provides the average mass of hemoglobin present in the blood cells.

The above-described FTP system 802 offers several advantages, including:

Simpler Setup: Interferometry is not required to capture phase information. The galvo mirror-based laser beam scanning method is replaced by an LED array 804 to provide angular illumination. A low-magnification objective 806 (e.g., 20×) is used, providing a wider FOV.

Speed: Since a lower magnification objective is used, a larger volume is captured, improving the speed of data acquisition. The system 802 can capture 2 mm×2 mm×100 µm volume at 0.5 µm×0.5 µm×4 µm voxel resolution without the need for any mechanical scanning.

Small device with low-cost components: Since the disclosed system 802 can make use of off-the-shelf tub lenses 806 and cameras 810 with CMOS sensors as well as minimal mechanical components, it is possible to make the device relatively smaller and cheaper.

No requirement of reagents: Hematology analyzers typically require multiple reagents for correct operations. Since the disclosed system 802 is imaging-based, it only needs the blood smear. Tomographic imaging also eliminates the need for any contrasting agents like stains to highlight blood cells.

Can be generalized to other pathologies: Information is highly useful for cytology and histopathology where thick samples are analyzed. The system 802 can be used with minor modifications and different software for analyses in other pathology domains as well.

The systems and methods described herein can be implemented in hardware, software, firmware, or combinations of hardware, software and/or firmware. In some examples, the computing systems described in this specification may be implemented using a non-transitory computer readable medium storing computer executable instructions that when executed by one or more processors of a computer cause the computer to perform operations. Computer readable media suitable for implementing the computing systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a computing system described in this specification may be located on a single device or computing platform or may be distributed across multiple devices or computing platforms.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

In some aspects, imaging and/or feature detection is provided according to one or more of the following statements of the disclosure.

Statement 1. An automated imaging system, comprising: an optical hardware system having one or more tunable elements; a visual detector system; and a computing system, wherein the computing system is configured to change a parameter of the one or more tunable elements in response to an automated decision by an artificial intelligence algorithm, and wherein the automated decision is determined by analyzing images of a sample created by the visual detector system.

Statement 2. The automated imaging system of statement 1, wherein the one or more tunable elements comprise a patterned illumination unit.

Statement 3. The automated imaging system of statements 1-2, wherein the patterned illumination unit comprises a programmable light emitting diode (LED) array.

Statement 4. The automated imaging system of statements 1-3, wherein the one or more tunable elements comprise a dynamically addressable lens element.

Statement 5. The automated imaging system of statements 1-4, wherein the dynamically addressable lens element comprises an electro-tunable lens.

Statement 6. The automated imaging system of statements 1-5, wherein the one or more tunable elements comprise a movable sample positioning stage.

Statement 7. The automated imaging system of statements 1-6, wherein the movable sample positioning stage comprises one or more of an x-y translation stage and a z-stage for focusing.

Statement 8. The automated imaging system of statements 1-7, wherein the optical hardware system includes a plurality of tunable elements.

Statement 9. The automated imaging system of statements 1-8, wherein the artificial intelligence algorithm comprises a neural network.

Statement 10. The automated imaging system of statements 1-9, wherein the automated decision is to detect objects of interest within a microscope slide.

Statement 11. The automated imaging system of statements 1-10, wherein the artificial intelligence algorithm is configured both to process digital images and to optimize task-specific settings for the one or more tunable elements.

Statement 12. The automated imaging system of statements 1-11, wherein the artificial intelligence algorithm optimizes the task-specific settings to reduce a task-specific loss function.

Statement 13. The automated imaging system of statements 1-12, wherein the task-specific loss function is configured to evaluate error in classification by the automated imaging system.

Statement 14. The automated imaging system of statements 1-13, wherein the optical hardware system and visual detection system are configured to perform automated scanning, and results of the automated scanning are fed into the artificial intelligence algorithm to improve the accuracy of the automated decision.

Statement 15. A method of detecting an object or feature of interest in a biological sample, comprising: using an optical hardware system and a visual detector system to create an image of a sample, wherein the optical hardware system includes one or more tunable elements; analyzing the image using an artificial intelligence algorithm to generate an automated decision; and adjusting at least one parameter of the one or more tunable elements based on the automated decision to maximize detection of the feature of interest.

Statement 16. The method of statements 15, further comprising iteratively feeding the at least one adjusted parameter into the artificial intelligence algorithm.

Statement 17. The method of statements 15-16, comprising initially imaging the sample at a low resolution and subsequently imaging the same sample at a higher resolution using the at least one adjusted parameter and affected by the one or more tunable elements.

Statement 18. The method of statements 15-17, wherein the optical hardware system includes one or more tunable elements selected from the group consisting of a patterned illumination unit, a dynamically addressable lens element, and a movable sample positioning stage.

Statement 19. The method of statements 15-18, wherein adjusting the one or more tunable elements to maximize detection of the feature of interest comprises adjusting the at least one parameter to reduce a task-specific loss function.

Statement 20. A non-transitory computer readable medium storing program code that, when executed by a processor, perform a method of detecting an object or feature of interest in a biological sample, comprising: using an optical hardware system and a visual detector system to create an image of a sample, wherein the optical hardware system includes one or more tunable elements; analyzing the image using an artificial intelligence algorithm to generate an automated decision; and adjusting at least one parameter of the one or more tunable elements based on the automated decision to maximize detection of the feature of interest.

What is claimed is:

1. An automated imaging system, comprising:
    an optical hardware system having a pattered illumination unit including a programmable light emitting diode (LED) array;
    a visual detector system; and
    a computing system configured to change a parameter of the programmable LED array in response to an automated decision by an artificial intelligence algorithm configured to optimize one or more settings for the programmable LED array for a particular task, the particular task being selected from the group consisting of detecting viruses, segmenting nuclei, detecting and counting white blood cells, and detecting tumors from tissue,
    wherein the artificial intelligence algorithm optimizes the task-specific settings of the programmable LED array to reduce a task-specific loss function,
    wherein the automated decision is determined by analyzing images of a sample created by the visual detector system, and
    wherein:
        the optical hardware system further includes a dynamically addressable lens element, and
        the computing system is further configured to change a parameter of the dynamically addressable lens element in response to the automated decision by the artificial intelligence algorithm.

2. The automated imaging system of claim 1, wherein the dynamically addressable lens element comprises an electro-tunable lens.

3. The automated imaging system of claim 1, wherein the artificial intelligence algorithm comprises a neural network.

4. The automated imaging system of claim 1, wherein the automated decision is to detect objects or features of interest within a microscope slide.

5. The automated imaging system of claim 1, wherein the task-specific loss function is configured to evaluate error in classification by the automated imaging system.

6. The automated imaging system of claim 1, wherein the optical hardware system and visual detection system are configured to perform automated scanning, and results of the automated scanning are fed into the artificial intelligence algorithm to improve the accuracy of the automated decision.

7. A method of detecting an object or feature of interest in a biological sample, comprising:
    using an optical hardware system and a visual detector system to create an image of a sample, wherein the optical hardware system includes a programmable light emitting diode (LED) array and an electro-tunable lens;
    analyzing, by a computing system, the image using an artificial intelligence algorithm to generate an automated decision; and
    adjusting, by the computing system, at least one parameter of the programmable LED array and at least one parameter of the electro-tunable lens based on the automated decision to maximize detection of the feature of interest,
    wherein adjusting the programmable LED array and the electro-tunable lens comprises optimizing one or more settings for the programmable LED array and the electro-tunable lens for a particular task, the particular task being selected from the group consisting of detecting viruses, segmenting nuclei, detecting and counting white blood cells, and detecting tumors from tissue,
    wherein the artificial intelligence algorithm optimizes the task-specific settings of the programmable LED array to reduce a task-specific loss function.

8. The method of claim 7, further comprising iteratively feeding the at least one adjusted parameter into the artificial intelligence algorithm.

9. The method of claim 7, comprising initially imaging the sample at a low resolution and subsequently imaging the same sample at a higher resolution using the at least one adjusted parameter of the programmable LED array and the electro-tunable lens, respectively.

10. A non-transitory computer readable medium storing program code that, when executed by a processor, perform a method of detecting an object or feature of interest in a biological sample, the method comprising:
    using an optical hardware system and a visual detector system to create an image of a sample, wherein the optical hardware system includes a programmable light emitting diode (LED) array and an electro-tunable lens;
    analyzing the image using an artificial intelligence algorithm to generate an automated decision; and
    adjusting at least one parameter of the programmable LED array and at least one parameter of the electro-tunable lens based on the automated decision to maximize detection of the feature of interest,
    wherein adjusting the programmable LED array and the electro-tunable lens comprises optimizing one or more settings for the programmable LED array and the electro-tunable lens for a particular task, the particular task being selected from the group consisting of detecting viruses, segmenting nuclei, detecting and counting white blood cells, and detecting tumors from tissue,
    wherein the artificial intelligence algorithm optimizes the task-specific settings of the programmable LED array to reduce a task-specific loss function.

11. The non-transitory computer readable medium of claim 10, wherein the artificial intelligence algorithm comprises a neural network.

12. The non-transitory computer readable medium of claim 10, wherein the automated decision is to detect objects or features of interest within a microscope slide.

13. The non-transitory computer readable medium of claim 10, wherein the artificial intelligence algorithm is configured both to process digital images and to optimize task-specific settings for the programmable LED array and the electro-tunable lens.

14. The non-transitory computer readable medium of claim 10, wherein the task-specific loss function is configured to evaluate error in classification by the automated imaging system.

15. The non-transitory computer readable medium of claim 10, wherein the optical hardware system and visual detection system are configured to perform automated scanning, and results of the automated scanning are fed into the artificial intelligence algorithm to improve the accuracy of the automated decision.

* * * * *